(12) United States Patent  
Strickland et al.

(10) Patent No.: US 7,502,954 B1  
(45) Date of Patent: Mar. 10, 2009

(54) HIGH AVAILABILITY DATA STORAGE SYSTEM

(75) Inventors: Stephen E. Strickland, Marlborough, MA (US); Timothy Dorr, Lancaster, MA (US); John V. Burroughs, Mason, NH (US); Michael A. Faulkner, Grafton, MA (US); Steven D. Sardella, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 553 days.

(21) Appl. No.: 10/854,007

(22) Filed: May 26, 2004

(51) Int. Cl.  
*G06F 11/00* (2006.01)

(52) U.S. Cl. .................. 714/6; 714/5; 714/7; 714/8; 714/10; 714/11; 714/12; 714/13

(58) Field of Classification Search .............. 714/6  
See application file for complete search history.

(56) References Cited

U.S. PATENT DOCUMENTS

| | | | |
|---|---|---|---|
| 5,987,566 A * | 11/1999 | Vishlitzky et al. ........... 711/114 |
| 6,055,604 A * | 4/2000 | Voigt et al. .................. 711/117 |
| 6,073,218 A * | 6/2000 | DeKoning et al. .......... 711/150 |
| 6,732,289 B1 * | 5/2004 | Talagala et al. ................. 714/6 |
| 7,035,975 B2 * | 4/2006 | Higaki et al. ................ 711/114 |
| 7,089,448 B2 * | 8/2006 | Hinshaw et al. ................. 714/6 |
| 7,146,522 B1 * | 12/2006 | Rowe et al. ..................... 714/6 |
| 7,155,552 B1 * | 12/2006 | Burroughs et al. .......... 710/300 |
| 7,159,150 B2 * | 1/2007 | Kenchammana-Hosekote et al. .......................... 714/43 |
| 7,181,608 B2 * | 2/2007 | Fallon et al. ................... 713/2 |
| 2005/0015545 A1 * | 1/2005 | Liu et al. ..................... 711/114 |

* cited by examiner

*Primary Examiner*—Emerson C Puente  
(74) *Attorney, Agent, or Firm*—Krishnendu Gupta; Scott A. Quellette

(57) ABSTRACT

A data storage system includes a disk drive array including a plurality of disk drives; a first storage processor for controlling the operation of the data storage system; a second storage processor for controlling the operation of the data storage system; a first arbiter for controlling communication of data from the first storage processor and the second storage processor to a first group of disk drives of the disk drive array; and a second arbiter for controlling communication of data from the first storage processor and the second storage processor to a second group of disk drives of the disk drive array. Selected data is redundantly stored on disk drives in the first group of disk drives and the second group of disk drives, such that, upon failure of the first arbiter, the selected data is available to the first storage processor and the second storage processor through the second arbiter.

30 Claims, 2 Drawing Sheets

HIGH AVAILABILITY DATA STORAGE SYSTEM

FIELD OF THE INVENTION

The present invention is directed generally to a high availability data storage system, and more particularly to a high availability data storage system having disk drives which are configured to enable the data storage system to continue operation upon a failure of certain components of the system.

BACKGROUND OF THE INVENTION

Data storage systems are used in a variety of businesses for the purpose of storing and maintaining data which is critical to the operation of the businesses and their customers. It is very important that such data storage systems be highly reliable to minimize or eliminate the chance of losing data if the system fails. The most secure and reliable systems employ total redundancy, in which every component of the system is replicated, such that, upon a failure of a component, another component takes over operation, so that the data storage system can remain fully functional. For example, two storage processors may be provided in a system such that if one fails, the other assumes the operation of the failed processor as well as maintaining its own. However, total redundancy is expensive and can be an inefficient use of system resources.

So-called "high availability" systems optimize the reliability of data storage systems by providing redundancy only of critical components to eliminate single points of failure. A single point of failure occurs when the failure of a single component of a system causes the entire system to cease operating, resulting in the potential loss of data. Therefore, one goal in designing a high availability data storage system is to provide a satisfactory level of reliability while keeping the cost of the system in check.

SUMMARY OF THE INVENTION

The present invention provides a high availability data storage system having a reduced number of arbiters which control access to disk drives for the storage processors that control the operation of the system. Each arbiter controls a discrete group of disk drives and data which is critical to the proper operation of the data storage system is redundantly stored on disk drives in each group. Accordingly, if one of the arbiters should fail, resulting in the loss of one group of disk drives, the storage processors are still able to access, through one of the operating arbiters, the redundantly-stored critical information stored in a different group.

According to one aspect of the invention, a data storage system includes a disk drive array including a plurality of disk drives; a first storage processor for controlling the operation of the data storage system; a second storage processor for controlling the operation of the data storage system; a first arbiter for controlling communication of data from the first storage processor and the second storage processor to a first group of disk drives of the disk drive array; and a second arbiter for controlling communication of data from the first storage processor and the second storage processor to a second group of disk drives of the disk drive array. Selected data is redundantly stored on disk drives in the first group of disk drives and the second group of disk drives, such that, upon failure of the first arbiter, the selected data is available to the first storage processor and the second storage processor through the second arbiter.

The data storage system may further include a third arbiter for controlling communication of data from the first storage processor and the second storage processor to a third group of disk drives of the disk drive array. Selected data is redundantly stored on disk drives in the first group of disk drives, the second group of disk drives and, the third group of disk drives such that, upon failure of the first arbiter, the selected data is available to the first storage processor and the second storage processor through the second and third arbiters. The disk drive array may include 12 drives. Each of the first, second and third groups of disk drives may include 4 disk drives. The selected data may be stored on a first disk drive included in the first group of disk drives, a second disk drive included in the second group of disk drives and a third and fourth disk drive included in the third group of disk drives. The selected data may include boot code for each of the first and second storage processors. The boot code for the first storage processor may be stored on the first disk drive and the third disk drive and the boot code for the second storage processor is stored on the second disk drive and the fourth disk drive. The selected data may include persistent storage data stored on the first disk drive, the second disk drive and the third disk drive. The selected data may include cache data stored on the first disk drive, the second disk drive and the third disk drive.

According to another embodiment, a data storage system includes a disk drive array including a plurality of disk drives; a first storage processor for controlling the operation of the data storage system; a second storage processor for controlling the operation of the data storage system; a first arbiter for controlling communication of data from the first storage processor and the second storage processor to a first group of disk drives of the disk drive array; a second arbiter for controlling communication of data from the first storage processor and the second storage processor to a second group of disk drives of the disk drive array; and a third arbiter for controlling communication of data from the first storage processor and the second storage processor to a third group of disk drives of the disk drive array. Selected data is redundantly stored on disk drives in the first group of disk drives, the second group of disk drives and the third group of disk drives such that, upon failure of the first arbiter, the selected data is available to the first storage processor and the second storage processor through the second and third arbiters.

BRIEF DESCRIPTION OF THE DRAWINGS

These and other features of the invention will become more readily apparent from the following detailed description when read together with the accompanying drawings, in which.

DETAILED DESCRIPTION

Figure 1:
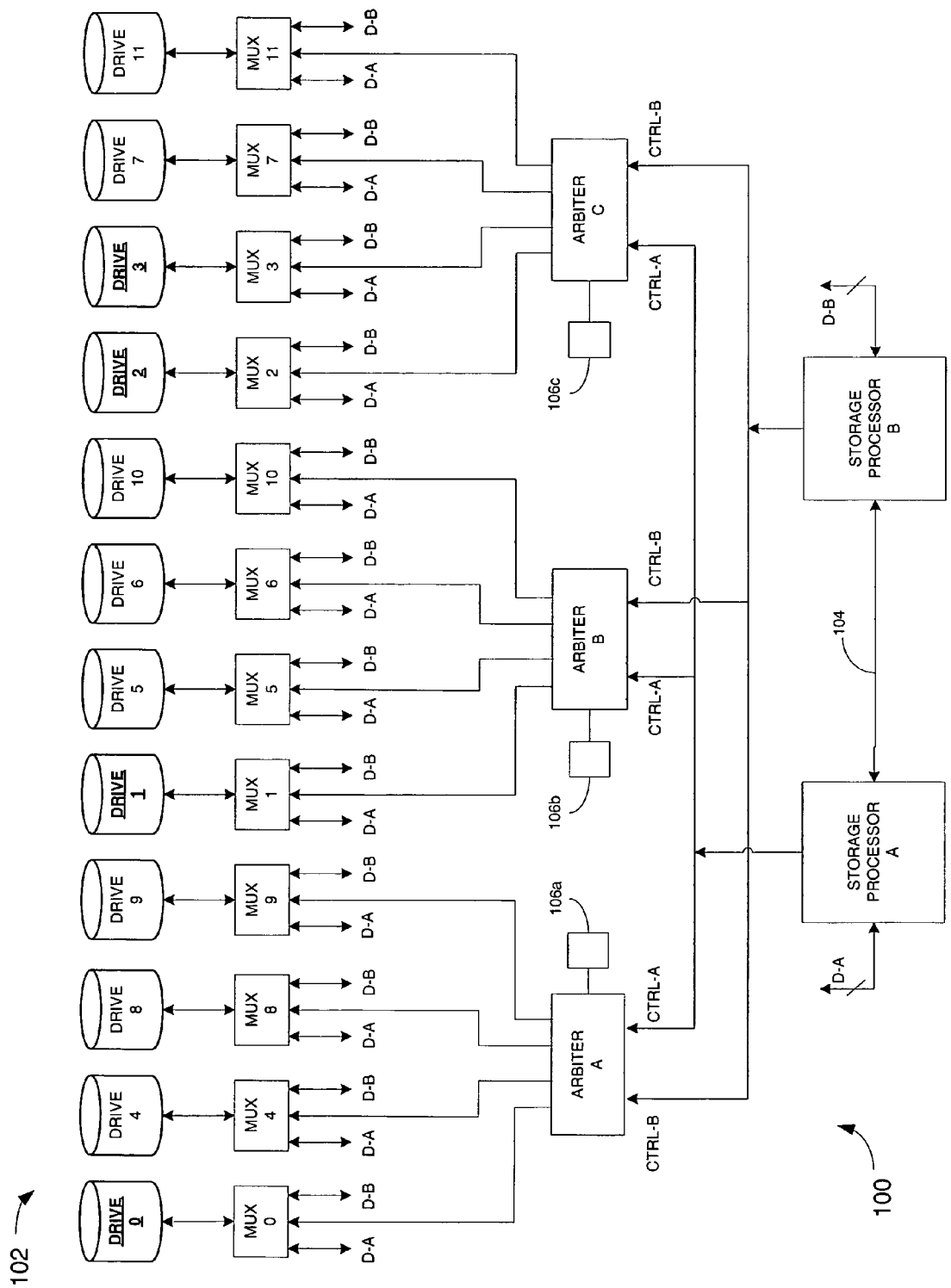
FIG. 1 is a schematic block diagram of the high availability data storage system in accordance with the present invention.

FIG. 1 is a schematic block diagram of the high availability data storage system 100 which performs a variety of data storage operations on behalf of clients (not shown) external to the system 100. System 100 includes Storage Processor A and Storage Processor B, which control the operation of the data storage system 100. Each of Storage Processors A and B are configured to perform data storage operations on behalf of one or more of the external clients, and to perform such operations independently of and concurrently with data storage operations performed by the other storage processor. Accordingly, the data storage system 100 is well-suited for operating in an active-active manner in which the multiple storage processors perform data storage operations simultaneously in order to achieve greater throughput, i.e., a greater number of operations in a given amount of time than that provided by only one storage processor operating during that time.

Storage Processors A and B control read and write transfers to and from disk drives Drive 0 through Drive 11 of disk drive array 102. Disk drives Drive 0 through Drive 11 are preferably Serial ATA devices which are configured to store and retrieve data in a non-volatile manner. Each of Drives 0 through 11 receives data read and write transfers from each of Storage Processors A and B, labeled D-A and D-B, respectively, through a corresponding multiplexer, MUX 0 through MUX 11. For simplicity, the data lines between Storage Processor A and Storage Processor B and multiplexers MUX 0 through MUX 11 are not shown. Only the data outputs of Storage Processor A and Storage Processor B and the data inputs of multiplexers MUX 0 through MUX 11, as well as the communication channel 104 between Storage Processor A and Storage Processor B are shown. The specific operation of the multiplexers MUX 0 through MUX 11 is described in U.S. patent application Ser. No. 10/746,317, which application is commonly owned by the assignee of the present application and is incorporated by reference herein in its entirety.

The outputs of multiplexers MUX 0 through MUX 11 are controlled by Arbiters A, B and C. Arbiters A, B and C are in turn controlled by control outputs CTRL-A and CTRL-B of Storage Processor A and Storage Processor B, respectively. In operation, Arbiters A, B and C determine which of the data read and write transfers D-A and D-B of each multiplexer MUX 0 through MUX 11 will be output to the corresponding disk drive Drive 0 through Drive 11, based on the control signals CTRL-A and CTRL-B received from Storage Processor A and Storage Processor B, respectively. The specific operation of the multiplexers MUX 0 through MUX 11 is described in U.S. patent application Ser. No. 10/735,238, which application is commonly owned by the assignee of the present application and is incorporated by reference herein in its entirety.

In the preferred embodiment, each of Arbiters A, B and C control access to four of the disk drives Drive 0 through Drive 11 of the disk drive array 102. It will be understood, however, that fewer than three or more than three arbiters my be used to control access to an equal or unequal number of the drives Drive 0 through Drive 11 of the disk drive array 102. As shown in FIG. 1, Arbiter A controls access to disk drives Drive 0, Drive 4, Drive 8 and Drive 9, through multiplexers MUX 0, MUX 4, MUX 8 and MUX 9, respectively; Arbiter B controls access to disk drives Drive 1, Drive 5, Drive 6 and Drive 10, through multiplexers MUX 1, MUX 5, MUX 6 and MUX 10, respectively; and Arbiter C controls access to disk drives Drive 2, Drive 3, Drive 7 and Drive 11, through multiplexers MUX 2, MUX 3, MUX 7 and MUX 11, respectively.

Each of Arbiters A, B and C is powered through a power supply arrangement 106a, 106b and 106c, respectively. In the preferred embodiment, each power supply arrangement 106a-106c includes a first regulator that receives a 12V input from a redundant 12V power supply and generates a 5V output. The arrangement further includes a second regulator that receives, as an input, the 5V output of the first regulator and which generates a 3.3V output that is used to power the associated arbiter. Since each arbiter receives its power through a discrete power supply arrangement, the failure of any one of the first or second regulators associated with a particular arbiter will cause only the particular arbiter to fail. The remaining arbiters, which are not powered by the failed power supply arrangement, will continue to operate normally. It will be understood that the voltage values referred to are preferred, but not necessary to the operation of the system 100.

During operation of the data storage system 100, Storage Processors A and B rely on system critical data that is stored on the disks of the disk drive array 102. Specifically, this data includes the boot code for each of Storage Processors A and B, Persistent Storage Manager code, or the PSM LUN, which is data that includes system relevant information that must be permanently stored in the disk drive array, such as the particular drive configuration of the system, and system vault cache. If any of this data becomes unavailable to the Storage Processors A and B, the data storage system would not be able to function properly. Since each arbiter controls access to specific drives in the disk drive array, if one of the arbiters fails, the data stored on the drives controlled by the arbiters becomes unavailable. Therefore, it is important to insure that the system critical data stored on the drives of the disk drive array 102 is always available to the Storage Processors A and B, even if one of the arbiters should fail.

Figure 2:
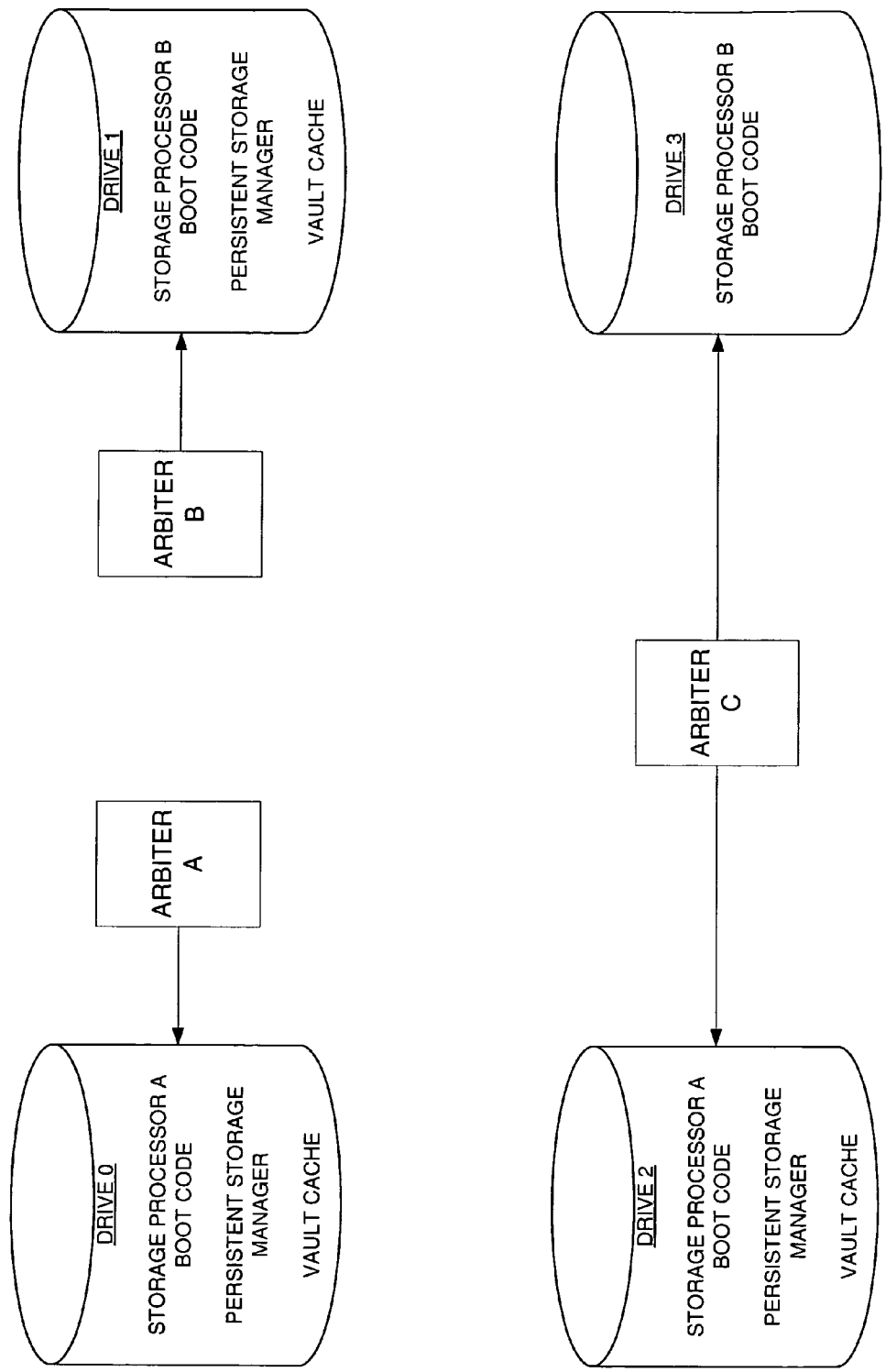
FIG. 2 is a schematic diagram of disk drives 0 through 3 of the high availability data storage system in accordance with the present invention.

As shown in FIG. 1, control of the four most significant drives Drive 0, Drive 1, Drive 2 and Drive 3, which are highlighted for clarity, is spread across all of the Arbiters A, B and C. Specifically, Arbiter A controls access to Drive 0, Arbiter B controls access to Drive 1 and Arbiter C controls access to Drive 2 and Drive 3. As shown in FIG. 2, the system critical data is stored across Drive 0, Drive 1, Drive 2 and Drive 3 in a manner that maintains access to the system critical data by Storage Processors A and B in the event of the failure of one of Arbiters A, B or C.

Specifically, Drive 0, whose access is controlled by Arbiter A, is configured to have stored thereon the boot code for Storage Processor A, the Persistent Storage Manager code and the system vault cache. Drive 1, whose access is controlled by Arbiter B, is configured to have stored thereon the boot code for Storage Processor B, the Persistent Storage Manager code and the system vault cache. Drive 2, whose access is controlled by Arbiter C, is configured to have stored thereon the boot code for Storage Processor A, the Persistent Storage Manager code and the system vault cache. Drive 3, whose access is also controlled by Arbiter C, is configured to have stored thereon the boot code for Storage Processor B. Preferably, the vault cache is striped across Drives 0, 1 and 2 in a RAID configuration, such that, if one of the drives becomes unavailable, the cache data from the unavailable drive is recoverable based on the cache data stored on the remaining available drives.

Based on this configuration, the critical system data is always available to the Storage Processors A and B, even if one of the Arbiters A, B or C fails. For example, should Arbiter A fail, the boot code for Storage Processor A, the Persistent Storage Manager code and the system vault cache stored on Drive 0 becomes unavailable. However, Storage Processor A is able to access the Storage Processor A boot code, Persistent Storage Manager code and vault cache stored on Drive 2 through Arbiter C, as well as the Persistent Storage Manager code and vault cache stored on Drive 1. Should Arbiter B fail, the boot code for Storage Processor B, the Persistent Storage Manager code and the system vault cache stored on Drive 1 becomes unavailable. However, Storage Processor B is able to access the Storage Processor B boot code stored on Drive 3 through Arbiter C, as well as the Persistent Storage Manager code and vault cache stored on Drive 2 through Arbiter C and the Persistent Storage Manager code and vault cache stored on Drive 0 through Arbiter A. Should Arbiter C fail, the Storage Processor A boot code, Persistent Storage Manager code and the vault cache stored on Drive 2, as well as the Storage Processor B boot code stored on Drive 3, become unavailable. However, Storage Processor A is able to access the Storage Processor A boot code stored on Drive 0 through Arbiter A, as well as the Persistent Storage Manager code and vault cache stored on Drive 0 and Drive 1 through Arbiters A and B, respectively. Likewise, Storage Processor B is able to access the Storage Processor B boot code stored on Drive 1 through Arbiter B, as well as the Persistent Storage Manager code and vault cache stored on Drive 0 and Drive 1 through Arbiters A and B, respectively.

Accordingly, the data storage system 100 is configured to enable the Storage Processors A and B to operate normally even if one of the Arbiters A, B or C should fail. The failure of one of the arbiters, while rendering the group of disk drives associated with the failed arbiter unavailable, does not render any of the critical system data unavailable. By storing the critical system data on disk drives that are controlled by different arbiters as described above, Storage Processor A and B are able maintain access to the critical system data in the event of a failure of one of the arbiters.

The invention may be embodied in other specific forms without departing from the spirit or essential characteristics thereof. For example, while the system 100 is described as utilizing SATA disk drives, other arrangements, such as diskette drives, tapes drives, CD-ROM drives and combinations thereof may also be utilized in the system. Furthermore, the system critical data stored on the drives is not limited to the types described above and can include any type of data whose availability must be maintained. Different ratios of arbiters to disk drives may also be utilized, as long as the system critical data is stored on the drives such that the failure of one arbiter does not render any of the critical system data unavailable. The critical system data may be stored on any drive within a group controlled by an arbiter, as it is not necessary for the most significant drive in each group to store the system critical data. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A data storage system comprising:
a disk drive array including a plurality of disk drives;
a first storage processor for controlling the operation of the data storage system;
a second storage processor for controlling the operation of the data storage system;
a first arbiter for controlling communication of data from the first storage processor and the second storage processor to a first group of disk drives of the disk drive array;
a second arbiter for controlling communication of data from the first storage processor and the second storage processor to a second group of disk drives of the disk drive array; and
a plurality of multiplexers, each being associated with one of the plurality of disk drives and receiving control signals from one of the first and second arbiters and data from each of the first and second storage processors;
wherein selected data communicated from the first storage processor and the second storage processor to the first group of disk drives of the disk drive array based on a control signal from the first arbiter is stored on disk drives in the first group of disk drives and also stored on disk drives in the second group of disk drives based on a control signal from the second arbiter, such that, upon failure of the first arbiter, the selected data is available to the first storage processor and the second storage processor through the second arbiter.

2. The data storage system of claim 1 further comprising a third arbiter for controlling communication of data from the first storage processor and the second storage processor to a third group of disk drives of the disk drive array;
wherein the selected data is stored on disk drives in the first group of disk drives and also redundantly stored on disk drives in the second group of disk drives and the third group of disk drives such that, upon failure of the first arbiter, the selected data is available to the first storage processor and the second storage processor through the second and third arbiters.

3. The data storage system of claim 2 wherein the disk drive array includes 12 drives.

4. The data storage system of claim 3 wherein each of the first, second and third groups of disk drives includes 4 disk drives.

5. The data storage system of claim 2 wherein the selected data is stored on a first disk drive included in the first group of disk drives, a second disk drive included in the second group of disk drives and a third and fourth disk drive included in the third group of disk drives.

6. The data storage system of claim 5 wherein the selected data includes boot code for each of the first and second storage processors.

7. The data storage system of claim 6 wherein the boot code for the first storage processor is stored on the first disk drive and the third disk drive and the boot code for the second storage processor is stored on the second disk drive and the fourth disk drive.

8. The data storage system of claim 5 wherein the selected data includes persistent storage data.

9. The data storage system of claim 8 wherein the persistent storage data is stored on the first disk drive, the second disk drive and the third disk drive.

10. The data storage system of claim 5 wherein the selected data includes cache data.

11. The data storage system of claim 10 wherein the cache data is stored on the first disk drive, the second disk drive and the third disk drive.

12. The data storage system of claim 2 wherein the selected data includes boot code for each of the first and second storage processors.

13. The data storage system of claim 2 wherein the selected data includes persistent storage data.

14. The data storage system of claim 2 wherein the selected data includes cache data.

15. The data storage system of claim 1 wherein the selected data includes boot code for each of the first and second storage processors.

16. The data storage system of claim 1 wherein the selected data includes persistent storage data.

17. The data storage system of claim 1 wherein the selected data includes cache data.

18. A data storage system comprising:
a disk drive array including a plurality of disk drives;
a first storage processor for controlling the operation of the data storage system;

a second storage processor for controlling the operation of the data storage system;

a first arbiter for controlling communication of data from the first storage processor and the second storage processor to a first group of disk drives of the disk drive array;

a second arbiter for controlling communication of data from the first storage processor and the second storage processor to a second group of disk drives of the disk drive array;

a third arbiter for controlling communication of data from the first storage processor and the second storage processor to a third group of disk drives of the disk drive array; and a plurality of multiplexers, each being associated with one of the plurality of disk drives and receiving control signals from one of the first, second and third arbiters and data from each of the first and second storage processors;

wherein selected data communicated from the first storage processor and the second storage processor to the first group of disk drives of the disk drive array based on a control signal from the first arbiter is stored on disk drives in the first group of disk drives and also redundantly stored on disk drives in the second group of disk drives based on a control signal from the second arbiter and the third group of disk drives based on a control signal from the third arbiter such that, upon failure of the first arbiter, the selected data is available to the first storage processor and the second storage processor through the second arbiter and the third arbiter.

19. The data storage system of claim 18 wherein the disk drive array includes 12 drives.

20. The data storage system of claim 19 wherein each of the first, second and third groups of disk drives includes 4 disk drives.

21. The data storage system of claim 19 wherein the selected data is stored on a first disk drive included in the first group of disk drives, a second disk drive included in the second group of disk drives and a third and fourth disk drive included in the third group of disk drives.

22. The data storage system of claim 21 wherein the selected data includes boot code for each of the first and second storage processors.

23. The data storage system of claim 22 wherein the boot code for the first storage processor is stored on the first disk drive and the third disk drive and the boot code for the second storage processor is stored on the second disk drive and the fourth disk drive.

24. The data storage system of claim 21 wherein the selected data includes persistent storage data.

25. The data storage system of claim 24 wherein the persistent storage data is stored on the first disk drive, the second disk drive and the third disk drive.

26. The data storage system of claim 21 wherein the selected data includes cache data.

27. The data storage system of claim 26 wherein the cache data is stored on the first disk drive, the second disk drive and the third disk drive.

28. The data storage system of claim 19 wherein the selected data includes boot code for each of the first and second storage processors.

29. The data storage system of claim 18 wherein the selected data includes persistent storage data.

30. The data storage system of claim 18 wherein the selected data includes cache data.

* * * * *